Sept. 27, 1949.  F. C. WILLIS  2,482,995
TENSIONING TOOLHOLDER
Filed May 29, 1944  2 Sheets-Sheet 1
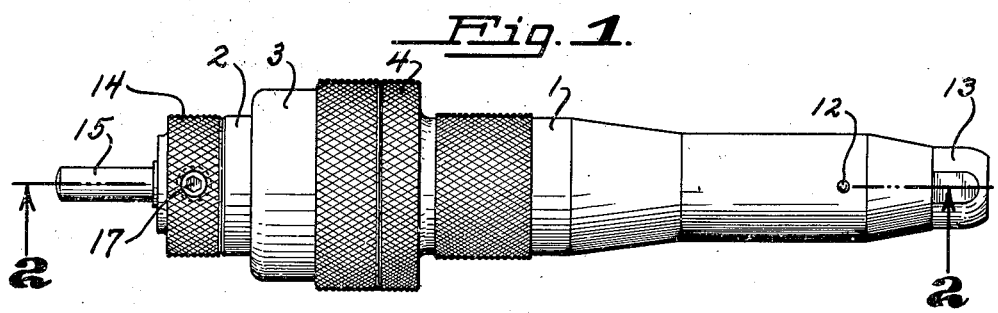
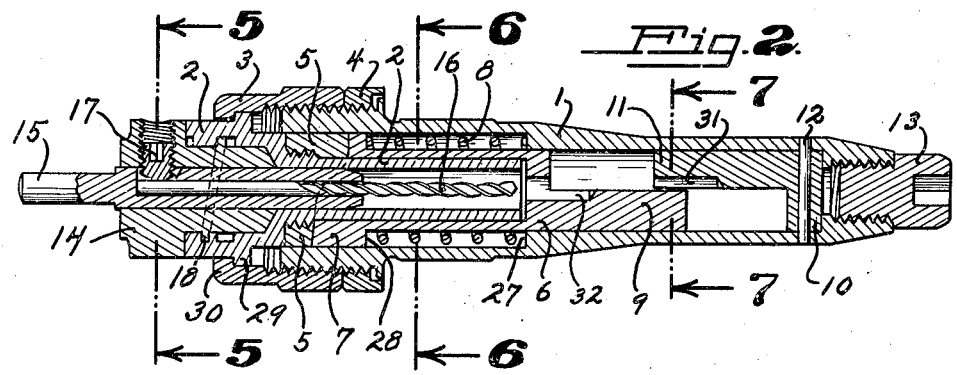
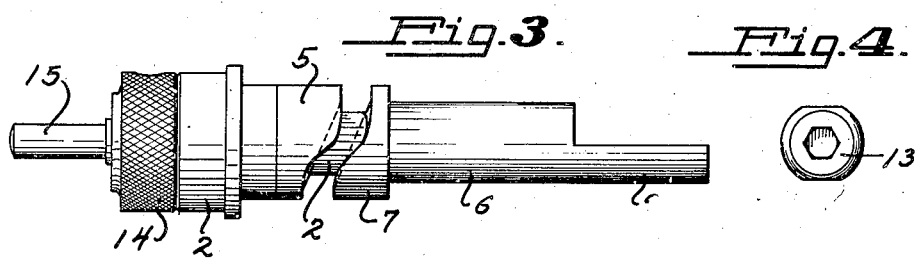
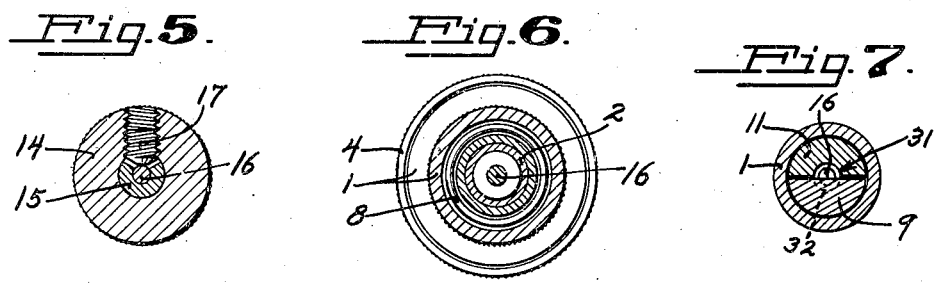
INVENTOR,
FRANK C. WILLIS.
BY
Chas. E. Townsend
ATTORNEY.

Sept. 27, 1949.    F. C. WILLIS    2,482,995
TENSIONING TOOLHOLDER
Filed May 29, 1944    2 Sheets-Sheet 2
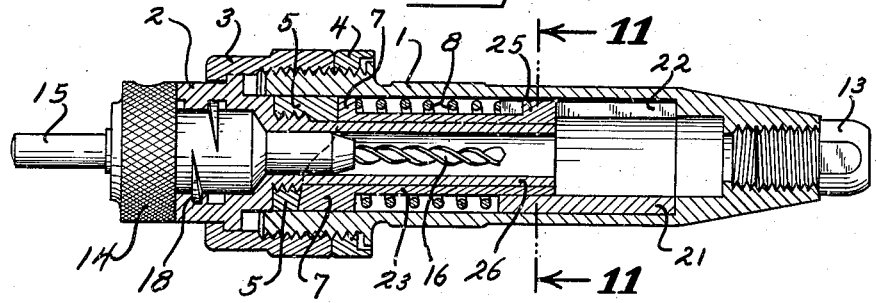
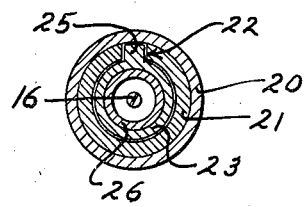
INVENTOR,
FRANK C. WILLIS.
BY
Chas. E. Townsend
ATTORNEY.

Patented Sept. 27, 1949

2,482,995

UNITED STATES PATENT OFFICE 2,482,995

TENSIONING TOOLHOLDER

Frank C. Willis, Redwood City, Calif.

Application May 29, 1944, Serial No. 537,770

1 Claim. (Cl. 64—29)

The present invention relates to tool holders and more particularly to a tool holder adapted to tighten bolts, screws and the like to a predetermined tension.

In many industries, power tools are at present employed for various operations on metal, wood and other materials. Particular examples of such power tools are electrically and compressed air powered drills, reamers, screw drivers, socket wrenches, etc. In present practice, separate power driven units are generally employed for each of these operations. Since a single operator often performs a number of these operations in sequence, as for example, drilling a number of holes and then setting screws or bolts in the holes before drilling another group of holes, it will be seen that the operator must have at hand at least two or more power driven tools, one of which is idle while the other is in use. This is undesirable from standpoints of both economy and efficiency. On the other hand, of a single power driven tool is used for the drilling operation, for example, and the screws or bolts set or other operations carried out with hand tools, it is apparent that the output of completed items upon which a given sequence of operations is carried out will be greatly reduced. Furthermore, even when two power driven units are employed, it is usually necessary to utilize a tensioning tool, i. e. a tool which automatically releases when a predetermined tension is placed on the driving element, for one or more of the operations such as setting screws, tightening nuts, bolts, and the like, etc., in order to prevent stripping of the threads or breaking of the fastener due to excess tightening. The tensioning drivers in common use at the present time are exceedingly complicated and heavy tools are generally considered to be expensive for use in other than very large scale operations.

It is an object of the present invention to provide a tensioning tool holder which is adapted for use with any conventional power source, as for example, an ordinary electric drill. Another object is to provide a tool holder which is readily and easily converted from direct power drive without the tension release feature to a tensioning tool holder and vice versa. A further object is to provide a tensioning tool holder which is easily adjusted to any desired degree of tension. A still further object is to provide a tensioning tool holder which is adapted to various types of tools. Still another object is to provide a tensioning tool holder with safety release means to prevent excessive tensioning under all conditions.

Other objects, together with some of the advantages to be derived in utilizing the present invention, will become apparent from the following detailed description thereof, taken together with the accompanying drawings forming a part of the specification, and wherein:

Figure 1 is a side elevation of a tensioning tool holder according to the present invention.

Figure 2 is a sectional plan view through 2—2 of Figure 1.

Figure 3 is a side elevation of the tool holder according to Figure 1 with the outer casing removed and the tool in the position shown in Figure 2.

Figure 4 is an end elevation of the tool shown in the tool holder in Figures 1 and 2.

Figure 5 is a sectional end elevation through 5—5 of Figure 2.

Figure 6 is a sectional end elevation through 6—6 of Figure 2.

Figure 7 is a sectional end elevation through 7—7 of Figure 2.

Figure 8 is a side elevation of another type of tool which may be utilized with the tool holder.

Figure 9 is an end elevation of the tool shown in Figure 8.

Figure 10 is a side elevation, partly in section, of a modified form of the tool holder shown in Figures 1 and 2.

Figure 11 is a sectional end elevation through 11—11 of Figure 10.

Referring particularly to the embodiment of the invention illustrated in Figures 1–7 inclusive, the tool holder comprises a tubular body casing 1, sleeve cap 3 threadedly engaging the upper end of body casing 1 and being secured in any desired position within the limits of the threads by means of lock sleeve 4 which also threadedly engages body casing 1.

Clutch element 6 is slidably disposed within body casing 1, defining an annular chamber between itself and body casing 1, wherein a coil spring 8 is disposed. The lower end of spring 8 bears against annular shoulder 27 provided in body casing 1 and the upper end bears against annular shoulder 28 provided on clutch element 6. Inner casing element 2 is slidably disposed at its lower end within clutch element 6 and extends beyond body casing 1 at its upper end, being provided with an annular shoulder 29 which is engaged by the cap portion 30 of sleeve cap 3. The upper end of casing element 2 is provided with an internal, square cut female thread to receive tool head 14 which is provided with square cut male threads engaging inner casing element 2 at 18. Bit holder 15 is rigidly disposed within tool head 14 and extends within inner casing element 2. A drill or other tool as at 16 is disposed within bit holder 15 and secured by means of set screw 17 which passes through tool head 14 and bit holder 15 in threaded engagement therewith. Grooves may be provided in shaft 11 as at 31 and in clutch element 6 as at 32 to accommodate tools longer than the drill shown at 16 within the body of the tool holder.

Clutch head 5 is threadedly and rigidly mounted on inner casing element 2 and bears against clutch head 7 which is formed as part of clutch element 6. Clutch heads 5 and 7 are each formed with semi-helically cut contact faces, the angles of which are supplementary, as shown particularly in Figure 3. The lower end of clutch element 6 terminates in a half round shaft at 9. Element 10 is rigidly positioned in the lower end of body casing 1 by means of pin 12 or other suitable means and extends towards the upper end of the tool holder, terminating in a half round shaft at 11, the flat faces of shafts 9 and 11 engaging in sliding contact. Other mechanical equivalents of the releasable clutch elements shown at 5 and 7 may be substituted therefor, although the semi-helical elements illustrated have been found in practice to operate successfully under all conditions and are preferred for this reason.

The tip of body casing 1 is internally threaded to receive various tools provided with threaded bases, as for example the hexagon socket wrench shown at 13 of Figures 1, 2, and 4 or a screw driving head such as shown in Figures 8 and 9 at 19. Any other suitable means may, of course, be utilized to secure the tool in the tip of the tool holder.

The tool holder functions in the following manner: Inner casing 2, clutch head 5, tool head 14 and bit holder 15 are all rotatable and slidable as a unit within body casing 1, being normally urged in a direction away from the tip of the tool holder by the action of spring 8 bearing against shoulder 27 of body casing 1 and against shoulder 28 of clutch element 6. The extent to which these elements are moved away from the tool holder tip is limited by sleeve cap 3, which is threaded on body casing 1 and engages the shoulder 29 provided on inner casing 2. In addition, clutch element 6 is also slidable and rotatable with respect to that part of inner casing 2 which it surrounds, being normally secured in the position shown in Figures 1 and 2 by the spring force urging clutch head 7 against clutch head 5 which is rigidly and non-rotatably mounted on inner casing 2. Clutch element 6, however, is slidable but non-rotatable with respect to body casing 1 due to the sliding engagement of half round shaft 9 with half round shaft 11 which is rigidly and non-rotatably mounted within body casing 1. Thus, with the protruding end of bit holder 15 secured in the chuck of a conventional power driven drill, the tool holder as a unit turns with bit holder 15.

However, if the rotation of body casing 1 is prevented, as for example occurs when hexagonal wrench 13 is engaging a nut which has been threaded into place, the rotative force which is still being applied to clutch head 5 through tool head 14 and inner casing 2 forces clutch head 7 and clutch element 6 towards the tip of the tool holder against the compression force of spring 8 until clutch head 5 is free to rotate with respect to clutch head 7. At this point, bit holder 15, tool head 14, inner casing 2 (which is threadedly engaged by tool head 14) and clutch head 5 continue to rotate with respect to the other elements of the tool holder, the helical faces of clutch heads 5 and 7 making intermittent contact as clutch head 5 rotates and clutch element 6 reciprocating on inner casing 2. When setting a screw or tensioning a bolt and during various other operations, the intermittent contact of the helical clutch faces, with consequent intermittent torsion forces applied to the tool in the tip of the tool holder, is of great benefit in assuring proper setting and/or tensioning of the work.

In the embodiment shown in Figures 10 and 11, the mechanism is substantially the same as that shown in Figures 1-7 inclusive except in the means for preventing rotation of clutch head 7 with respect to body casing 1. In Figure 10, element 10 of Figure 2 is replaced with a sleeve 21 which is sweated or otherwise firmly positioned with body casing 1 and provided with a keyway 22. Clutch element 23 carrying clutch head 7 is slidable on inner casing 2 in the same manner as clutch element 6 of Figure 2 and is provided with a key 25 which is slidable within keyway 22. Spring 8 bears against the end of sleeve 21 and against clutch head 7 as shown. The operation of the release mechanism is the same as that described above with respect to the construction shown in Figures 1-7 inclusive, i. e. when the tip of the tool holder is restrained, clutch element 23 is forced against the compression of spring 8 towards the tip of the tool holder, key 25 sliding in keyway 22, until tool head 14, inner casing 2 and clutch head 5 are free to rotate with bit holder 15 and with respect to body casing 1 and clutch element 26. Intermittent contact of the helical faces of clutch heads 5 and 7 occurs and clutch element 26 reciprocates on inner casing 2, key 25 meanwhile reciprocating in keyway 22.

The force urging clutch head 7 against clutch head 5, and consequently the tension force exerted by hexagonal socket wrench 13 on the nut, is a function of the degree of compression of spring 8. The compression of spring 8 may be pre-adjusted as desired by sleeve cap 3. As the sleeve cap 3 is threaded further onto body casing 1, shoulder 29 of inner casing 2 is brought closer to body casing 1 and the degree of compression of spring 8 proportionately increased. Sleeve cap 3 may then be secured in the desired position by means of lock sleeve 4 which is independently rotatable with respect to sleeve cap 3 and also threaded on body casing 1. The tension applied to the particular tool in the tip of the tool holder may be further controlled by the operator in the force with which he urges the tool holder against the work. Thus, he may increase the compression on spring 8 beyond that which has been pre-set by sleeve cap 3 by manually urging bit holder 15, tool head 14, inner casing 2, clutch head 5 and clutch element 6 against spring 8.

However, even when spring 8 is under maximum compression adjustment, i. e. when body casing 1 is in contact with shoulder 29 of inner casing 2, whether these conditions are brought about by adjustment of sleeve cap 3 or by manual pressure brought to bear by the operator, the clutch disengaging action will still take place. This is accomplished by providing sufficient clearance between the end of shaft 9 and element 10 and between the end of shaft 11 and clutch element 6 to permit the movement of clutch element 6 towards element 10 a distance sufficient to permit rotation of clutch head 7 with respect to clutch head 5 under the extreme conditions set forth above. In the embodiment of the invention in Figures 10 and 11, keyway 22 is of sufficient length to permit disengagement of clutch heads 5 and 7 when spring 8 is at its maximum compression adjustment.

Tool head 14 is easily and rapidly disengageable from inner casing 2 as a result of the course, square-thread engagement therebetween provided, and when disengaged may be used in the manner of a conventional tool chuck without the tensioning feature provided by the rest of the tool holder. The present tool holder is particularly suited for use in those operations wherein it is desirable to provide non-releasable tool holding means for drilling holes, reaming or similar operations, and thereafter to insert a bolt, screw or other fastening means in the hole which has been drilled or reamed and tighten the fastener under a given maximum tension. The drilling or analogous operations may be carried out using the tool head alone with the desired drill, reamer or the like secured therein by set screw 17, and when the first operation has been completed, the tool head rapidly threaded into inner casing 2 and a fastener placed in the drilled or reamed hole tightened to any desired tension by means of the proper tool in the tip of the tensioning tool holder. An operator with a single power unit utilizing a tool holder according to the present invention is thus enabled to perform a multiplicity of diverse operations, both of the type requiring an automatically releasable tensioning mechanism and those wherein the use of such mechanisms is either undesirable or unnecessary. The change from tensioning to non-tensioning operations requires but a matter of seconds of the operator's time.

It will be appreciated, of course, that any type of tool may be inserted in the tip of the tool holder, as for example, various shaped screw drivers adapted to the setting of round slotted-head, fillister head, Phillips head, hexagon head, slotted counter-sunk and other types of screws in wood or metal, various types of socket heads for tightening nuts or bolts as well as any other type of tool requiring a rotating power drive and a tension release mechanism. The tool holder may be attached to any type of hand held or bench held power means which is supplied with a chuck to engage bit holder 15, to drill presses, and to other similar equipment.

I claim as my invention:

In a tool holder of the class described, the combination comprising a body casing, tool securing means at the tip of said body casing, an inner casing rotatably and slidably disposed within said body casing, driving means detachably engaging said inner casing and extending without said inner casing, a first releasable clutch head rigidly mounted on said inner casing, a clutch element rotatably and slidably mounted on said inner casing, a second releasable clutch head rigidly mounted on said clutch element, spring means under compression engaging said body casing and normally urging said second clutch head into engagement with said first clutch head, a key formed as a part of said clutch element engaged in a keyway in said body casing to secure said clutch element in slidable and non-rotatable relationship with said body casing.

FRANK C. WILLIS.

REFERENCES CITED

The following references are of record in the file of this patent:

UNITED STATES PATENTS

| Number | Name | Date |
| --- | --- | --- |
| 1,672,964 | Stull | June 12, 1928 |
| 1,814,087 | Hayward | July 14, 1931 |
| 2,157,574 | Siesel | May 9, 1939 |
| 2,275,004 | Behl | Mar. 3, 1942 |
| 2,286,292 | Mall | June 6, 1942 |
| 2,293,878 | Worden | Aug. 25, 1942 |

FOREIGN PATENTS

| Number | Country | Date |
| --- | --- | --- |
| 89,743 | Sweden | 1937 |

OTHER REFERENCES

American Machinist, vol. 58, No. 6, February 8, 1923, page 233. Copy in 279–1.